(12) United States Patent
Chen et al.

(10) Patent No.: US 10,587,669 B2
(45) Date of Patent: Mar. 10, 2020

(54) VISUAL QUALITY METRICS

(71) Applicant: Facebook, Inc., Menlo Park, CA (US)

(72) Inventors: Minchuan Chen, Redmond, WA (US);
Shankar Lakshmi Regunathan, Redmond, WA (US); Sonal Gandhi, Seattle, WA (US); Yaming He, Redmond, WA (US); Amit Puntambekar, Fremont, CA (US); Michael Hamilton Coward, Menlo Park, CA (US)

(73) Assignee: Facebook, Inc., Menlo Park, CA (US)

( * ) Notice: Subject to any disclaimer, the term of this patent is extended or adjusted under 35 U.S.C. 154(b) by 85 days.

(21) Appl. No.: 15/849,424

(22) Filed: Dec. 20, 2017

(65) Prior Publication Data
US 2019/0190976 A1  Jun. 20, 2019

(51) Int. Cl.
| | | |
|---|---|---|
| *H04L 29/06* | (2006.01) | |
| *H04L 29/08* | (2006.01) | |
| *H04N 21/485* | (2011.01) | |
| *H04N 21/4402* | (2011.01) | |
| *H04N 21/462* | (2011.01) | |
| *H04N 21/472* | (2011.01) | |
| *G06N 20/00* | (2019.01) | |
| *G06F 16/40* | (2019.01) | |
| *H04N 21/414* | (2011.01) | |
| *H04N 21/845* | (2011.01) | |
| *H04N 21/234* | (2011.01) | |

(Continued)

(52) U.S. Cl.
CPC .............. *H04L 65/80* (2013.01); *G06F 16/40* (2019.01); *G06N 20/00* (2019.01); *H04L 51/063* (2013.01); *H04L 65/4084* (2013.01); *H04L 65/60* (2013.01); *H04L 65/605* (2013.01); *H04L 67/10* (2013.01); *H04N 19/154* (2014.11); *H04N 21/23418* (2013.01); *H04N 21/41407* (2013.01); *H04N 21/440218* (2013.01); *H04N 21/4621* (2013.01); *H04N 21/47217* (2013.01); *H04N 21/4858* (2013.01); *H04N 21/8456* (2013.01); *H04N 19/10* (2014.11); *H04N 19/146* (2014.11)

(58) Field of Classification Search
CPC ........ H04L 51/063; H04L 65/80; H04N 19/10; H04N 19/146; H04N 19/154
See application file for complete search history.

(56) References Cited

U.S. PATENT DOCUMENTS

| | | | |
|---|---|---|---|
| 7,428,696 B2 * | 9/2008 | Shin .................. | H04L 29/06027 701/468 |
| 8,156,239 B1 * | 4/2012 | Ashrafi .................. | H04W 4/18 375/240.02 |

(Continued)

*Primary Examiner* — Lashonda T Jacobs
(74) *Attorney, Agent, or Firm* — Jordan IP Law, LLC

(57) ABSTRACT

In one embodiment, a method includes receiving multimedia content information associated with at least one segment of a multimedia content, receiving a request to view the at least one segment of the multimedia content from a client device, logging playback information associated with the viewing of the at least one segment of the multimedia content, determining a multimedia quality metric associated with the at least one segment of multimedia content based in part upon a portion of the received multimedia content information and a portion of the logged playback information, and classifying the at least one segment of the multimedia content with the multimedia quality metric.

18 Claims, 7 Drawing Sheets

(51) Int. Cl.
*H04N 19/154* (2014.01)
*H04L 12/58* (2006.01)
*H04N 19/10* (2014.01)
*H04N 19/146* (2014.01)

(56) References Cited

U.S. PATENT DOCUMENTS

| | | | | |
|---|---|---|---|---|
| 9,336,512 | B2* | 5/2016 | Outerbridge | G06Q 10/101 |
| 9,454,524 | B1* | 9/2016 | Modani | G06K 9/6215 |
| 9,479,696 | B1* | 10/2016 | Miller | G06Q 50/01 |
| 9,774,867 | B2* | 9/2017 | Fremlin | H04N 19/154 |
| 10,178,399 | B2* | 1/2019 | Orton-Jay | H04N 19/176 |
| 10,425,378 | B2* | 9/2019 | Gandhi | H04L 65/4084 |
| 2006/0147107 | A1* | 7/2006 | Zhang | G06K 9/036 |
| | | | | 382/159 |
| 2008/0134054 | A1* | 6/2008 | Clark | G06Q 10/10 |
| | | | | 715/753 |
| 2008/0136834 | A1* | 6/2008 | Zhang | G06K 9/00711 |
| | | | | 345/589 |
| 2009/0141990 | A1* | 6/2009 | Pigeon | G06T 9/004 |
| | | | | 382/233 |
| 2013/0263179 | A1* | 10/2013 | Dow | H04N 21/458 |
| | | | | 725/32 |
| 2013/0286868 | A1* | 10/2013 | Oyman | H04W 24/06 |
| | | | | 370/252 |
| 2014/0258552 | A1* | 9/2014 | Oyman | H04N 19/146 |
| | | | | 709/231 |
| 2015/0172762 | A1* | 6/2015 | Tokumo | H04N 21/2387 |
| | | | | 725/96 |
| 2015/0365447 | A1* | 12/2015 | Klein | G06F 16/00 |
| | | | | 709/204 |
| 2016/0021376 | A1* | 1/2016 | Andreopoulos | H04N 17/004 |
| | | | | 348/181 |
| 2016/0157209 | A1* | 6/2016 | Baldwin | H04W 72/005 |
| | | | | 370/216 |
| 2016/0335754 | A1* | 11/2016 | Aaron | G06T 7/0002 |
| 2017/0251033 | A1* | 8/2017 | Huysegems | H04L 67/26 |
| 2017/0295374 | A1* | 10/2017 | Aaron | H04N 19/154 |
| 2018/0084023 | A1* | 3/2018 | Stoop | H04L 67/02 |
| 2018/0174616 | A1* | 6/2018 | Aguilar | G06K 9/00718 |
| 2018/0210954 | A1* | 7/2018 | Guegan | G06Q 50/01 |
| 2018/0270486 | A1* | 9/2018 | Liu | H04N 19/146 |
| 2018/0302455 | A1* | 10/2018 | Bordoloi | H04L 65/607 |
| 2019/0028259 | A1* | 1/2019 | Shealy | H04L 5/08 |
| 2019/0156247 | A1* | 5/2019 | Faulhaber, Jr. | G06N 5/04 |
| 2019/0251474 | A1* | 8/2019 | Bigaj | G06N 20/00 |

* cited by examiner

VISUAL QUALITY METRICS

TECHNICAL FIELD

This disclosure generally relates to online digital content and evaluation of the quality of the online digital content.

BACKGROUND

A social-networking system, which may include a social-networking website, may enable its users (such as persons or organizations) to interact with it and with each other through it. The social-networking system may, with input from a user, create and store in the social-networking system a user profile associated with the user. The user profile may include demographic information, communication-channel information, and information on personal interests of the user. The social-networking system may also, with input from a user, create and store a record of relationships of the user with other users of the social-networking system, as well as provide services (e.g., wall posts, photo-sharing, event organization, messaging, games, or advertisements) to facilitate social interaction between or among users.

The social-networking system may send over one or more networks content or messages related to its services to a mobile or other computing device of a user. A user may also install software applications on a mobile or other computing device of the user for accessing a user profile of the user and other data within the social-networking system. The social-networking system may generate a personalized set of content objects to display to a user, such as a newsfeed of aggregated stories of other users connected to the user.

SUMMARY OF PARTICULAR EMBODIMENTS

In particular embodiments, the social-networking system may compute a metric indicating whether a segment of displayed multimedia content is considered high quality given the various factors associated with the video. The metric may be referred to as a High Video Quality (HVQ) metric. Existing systems may consider the video resolution (e.g., "High Definition (HD)") of video content to determine whether or not the video content is of high quality. However, the resolution metric may not account for other factors such as poor compression, low bitrate, or device dimensions, that may affect whether or not multimedia content is perceived to be of high quality on a particular client device. As the proposed metric may be computed based on various factors, including bit rate, structural similarly (SSIM) index, dimension of display, orientation of display, and other suitable factors as well as the video resolution, the metric may allow the social-networking system to identify segments of High Quality video based on the various factors. In particular embodiments, the social-networking system may receive multimedia content information associated with a multimedia content. The multimedia content information may include resolution, bit rate, SSIM, or any suitable information. The social-networking system may receive the multimedia content information from one or more transcoding servers. The social-networking system may receive a request to view the multimedia content from a client device. The social-networking system may obtain playback information corresponding to a segment of the multimedia content. The playback information may comprise a download bitrate from the client device. The social-networking system may then calculate a HVQ metric for the segment of the multimedia content based, at least in part, upon encoding, compression quality, bit rate, SSIM index, dimensions of display, orientation of display, resolution of display, and resolution of the multimedia content. The social-networking system may then classify the segment of the multimedia content with the HVQ metric. The social-networking system may provide a manifest corresponding to the next segment of the requested multimedia content to the client device. The manifest may be determined based on the playback information from the client device. In particular embodiments, the social-networking system may utilize Machine Learning (ML) techniques to compute the HVQ metric. A ML model to compute a probability whether or not a segment of displayed multimedia content is perceived as high quality by the user may be trained with training data. The training data may comprise a large collection of multimedia streaming records that comprise identifier of a video segment, streaming instance identifier, content information, playback information, and feedback. The ML model may compute a probability whether or not a segment of a multimedia content is perceived as high quality by the user based, at least in part, on encoding, compression quality, bit rate, dimensions of display, orientation of display, resolution of display, and any suitable factors. The social-networking system may re-train the ML model with recently collected training data. In particular embodiments, the ML model may produce a binary output whether or not a segment of multimedia content is perceived as high quality or not. As an example and not by way of limitation, users of a social-networking system may access a plurality of video contents from the social-networking system. The social-networking system may receive video quality metadata that is associated with a multimedia content. A transcoding server may compute the video quality metadata and submit to the social-networking system. The social-networking system may receive a request from a user on a client device to view the multimedia content. The social-networking system may log information associated with the viewing of the multimedia content (e.g., a DASH manifest) in a player log. The social-networking system may then calculate a high visual quality metric for a segment for the multimedia content by using the encoding of the multimedia content viewed by the user, the resolution of the multimedia content viewed by the user, bit rate associated with the multimedia content, a compression efficiency (e.g., Video Quality Measurement (VQM), SSIM index, Video Multi-method Assessment Fusion (VMAF), Multi-Scale SSIM, Peak Signal to Noise Ratio (PSNR)) associated with the multimedia content, dimension of the display of the user device, the orientation of display of the user device, and the resolution of the multimedia content. The social-networking system may classify and log the high visual quality metric with the segment of the multimedia content. In particular embodiments, the high visual quality metric may indicate whether the segment is a high visual quality if the high visual quality metric exceeds a threshold. The threshold may be a set threshold or an adaptive threshold.

In particular embodiments, the social-networking system may receive content information associated with at least one segment of a multimedia content. The content information may be received from one or more transcoding servers. The content information may comprise resolution of the at least one segment of the multimedia content, content analytics associated with the at least one segment of the multimedia content, compression of the at least one segment of the multimedia content, encoding format of the at least one segment of the multimedia content, compression quality associated with the at least one segment of the multimedia content, or any suitable characteristics associated with the at least one segment of the multimedia content. The social-networking system may receive a request to view the at least one segment of the multimedia content from a client device. The social-networking system may log playback information associated with the viewing of the at least one segment of the multimedia content. The playback information may comprise bit rate associated with the viewing of the at least one segment of the multimedia content, dimension of the display associated with the client device, orientation of the display associated with the viewing of the at least one segment of the multimedia content, resolution of display associated with the client device, viewing interface associated with the viewing of the at least one segment of the multimedia content, or any suitable characteristics associated with the viewing of the at least one segment of the multimedia content. The social-networking system may determine a High Video Quality (HVQ) metric associated with the at least one segment of multimedia content based in part upon a portion of the received content information and a portion of the logged playback information. The social-networking system may utilize Machine Learning (ML) techniques to determine the HVQ metric. The social-networking system may train a ML model with a large collection of multimedia content streaming records. The social-networking system may classify the at least one segment of the multimedia content with the HVQ metric. The social-networking system may determine that the at least one segment of the multimedia content is a high-quality segment by comparing the HVQ metric with a threshold. The threshold may comprise an adaptive threshold based in part upon a geographical region associated with the client device. In particular embodiments, the social-networking system may receive feedback associated with the classification of the at least one segment of the multimedia content and update a calculation used to determine the HVQ metric.

The embodiments disclosed herein are only examples, and the scope of this disclosure is not limited to them. Particular embodiments may include all, some, or none of the components, elements, features, functions, operations, or steps of the embodiments disclosed above. Embodiments according to the invention are in particular disclosed in the attached claims directed to a method, a storage medium, a system and a computer program product, wherein any feature mentioned in one claim category, e.g. method, can be claimed in another claim category, e.g. system, as well. The dependencies or references back in the attached claims are chosen for formal reasons only. However any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

DESCRIPTION OF EXAMPLE EMBODIMENTS

Figure 1:
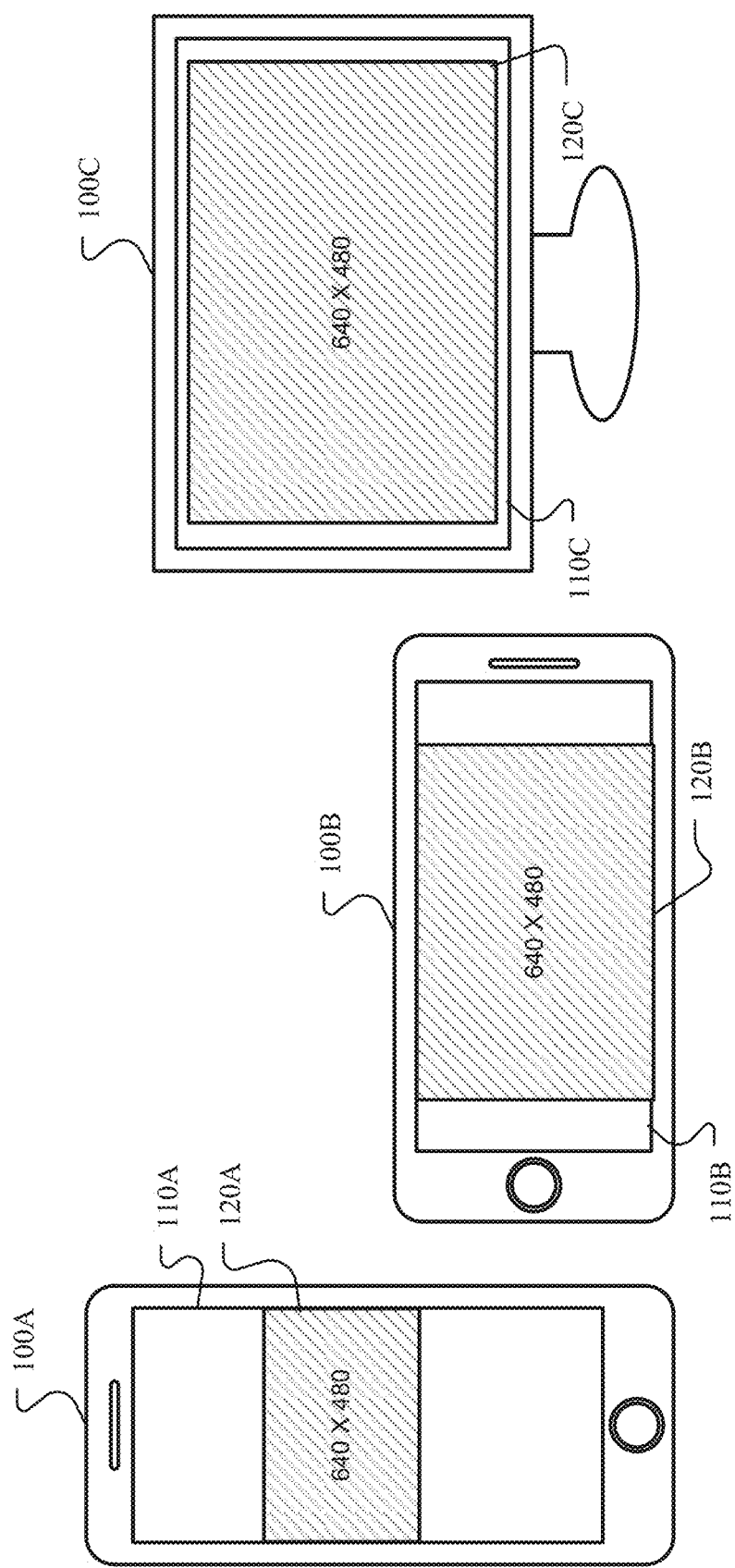
FIG. 1 illustrates example scenarios where a segment of video content is played in various circumstances.

In particular embodiments, the social-networking system 560 may compute a metric indicating whether or not a segment of displayed multimedia content is considered high quality given the various factors associated with the video. The metric may be referred to as a High Video Quality (HVQ) metric. Existing systems may consider the video resolution (e.g., "High Definition (HD)") of video content to determine whether or not the video content is of high quality. However, the resolution metric may not account for other factors such as poor compression, low bitrate, or device dimensions, that may affect whether or not multimedia content is perceived to be of high quality on a particular client device. As the proposed metric may be computed based on various factors, including bit rate, structural similarly (SSIM) index, dimension of display, orientation of display, and other suitable factors as well as the video resolution, the metric may allow the social-networking system 560 to identify segments of High Quality video based on the various factors. In particular embodiments, the social-networking system 560 may receive multimedia content information associated with a multimedia content. The multimedia content information may include resolution, bit rate, SSIM, or any suitable information. The social-networking system 560 may receive the multimedia content information from one or more transcoding servers. The social-networking system 560 may receive a request to view the multimedia content from a client device. The social-networking system 560 may obtain playback information corresponding to a segment of the multimedia content. The playback information may comprise a download bitrate from the client device. The social-networking system 560 may then calculate a HVQ metric for the segment of the multimedia content based, at least in part, upon encoding, compression quality, bit rate, SSIM index, dimensions of display, orientation of display, resolution of display, and resolution of the multimedia content. The social-networking system 560 may then classify the segment of the multimedia content with the HVQ metric. The social-networking system 560 may provide a manifest corresponding to the next segment of the requested multimedia content to the client device. The manifest may be determined based on the playback information from the client device. In particular embodiments, the social-networking system 560 may utilize Machine Learning (ML) techniques to compute the HVQ metric. A ML model to compute a probability whether or not a segment of displayed multimedia content is perceived as high quality by the user may be trained with training data. The training data may comprise a large collection of multimedia streaming records that comprise identifier of a video segment, streaming instance identifier, content information, playback information, and feedback. The ML model may compute a probability whether or not a segment of a multimedia content is perceived as high quality by the user based, at least in part, on encoding, compression quality, bit rate, dimensions of display, orientation of display, resolution of display, and any suitable factors. The social-networking system 560 may re-train the ML model with recently collected training data. In particular embodiments, the ML model may produce a binary output whether or not a segment of multimedia content is perceived as high quality. As an example and not by way of limitation, users of a social-networking system may access a plurality of video contents from the social-networking system. The social-networking system 560 may receive video quality metadata that is associated with a multimedia content. A transcoding server may compute the video quality metadata and submit to the social-networking system. The social-networking system 560 may receive a request from a user on a client device to view the multimedia content. The social-networking system 560 may log information associated with the viewing of the multimedia content (e.g., a DASH manifest) in a player log. The social-networking system 560 may then calculate a high visual quality metric for a segment for the multimedia content by using the encoding of the multimedia content viewed by the user, the resolution of the multimedia content viewed by the user, bit rate associated with the multimedia content, a compression efficiency (e.g., Video Quality Measurement (VQM), SSIM index, Video Multimethod Assessment Fusion (VMAF), Multi-Scale SSIM, Peak Signal to Noise Ratio (PSNR)) associated with the multimedia content, dimension of the display of the user device, the orientation of display of the user device, and the resolution of the multimedia content. The social-networking system 560 may classify and log the high visual quality metric with the segment of the multimedia content. In particular embodiments, the high visual quality metric may indicate whether or not the segment is a high visual quality if the high visual quality metric exceeds a threshold. The threshold may be a set threshold or an adaptive threshold. Although this disclosure describes computing a metric indicating whether or not a segment of displayed multimedia content is considered high quality in a particular manner, this disclosure contemplates computing a metric indicating whether or not a segment of displayed multimedia content is considered high quality in any suitable manner.

In particular embodiments, the social-networking system 560 may receive content information associated with at least one segment of a multimedia content. The content information may be received from one or more transcoding servers. The content information may comprise resolution of the at least one segment of the multimedia content, content analytics associated with the at least one segment of the multimedia content, compression of the at least one segment of the multimedia content, encoding format of the at least one segment of the multimedia content, compression quality associated with the at least one segment of the multimedia content, or any suitable characteristics associated with the at least one segment of the multimedia content. The social-networking system 560 may receive a request to view the at least one segment of the multimedia content from a client device. The social-networking system 560 may log playback information associated with the viewing of the at least one segment of the multimedia content. The playback information may comprise bit rate associated with the viewing of the at least one segment of the multimedia content, dimension of the display associated with the client device, orientation of the display associated with the viewing of the at least one segment of the multimedia content, resolution of display associated with the client device, viewing interface associated with the viewing of the at least one segment of the multimedia content, or any suitable characteristics associated with the viewing of the at least one segment of the multimedia content. The social-networking system 560 may determine a High Video Quality (HVQ) metric associated with the at least one segment of multimedia content based in part upon a portion of the received content information and a portion of the logged playback information. The social-networking system 560 may utilize Machine Learning (ML) techniques to determine the HVQ metric. The social-networking system 560 may train a ML model with a large collection of multimedia content streaming records. The social-networking system 560 may classify the at least one segment of the multimedia content with the HVQ metric. The social-networking system 560 may determine that the at least one segment of the multimedia content is a high-quality segment by comparing the HVQ metric with a threshold. The threshold may comprise an adaptive threshold based in part upon a geographical region associated with the client device. In particular embodiments, the social-networking system 560 may receive feedback associated with the classification of the at least one segment of the multimedia content and update a calculation used to determine the HVQ metric.

Users of an online social network may access a plurality of multimedia contents available on the online social network. Keeping high Quality of Experience (QoE) while the users are watching the multimedia streaming may be important to the social-networking system 560. The social-networking system 560 may calculate a metric indicating whether or not a segment of a multimedia content is perceived as high quality by the user in order to manage the quality of the multimedia streaming perceived by the users. A legacy system may calculate such a metric only based on the generic resolution to determine whether or not a displayed multimedia content is perceived as high quality. However, this metric may fail to account for many other factors. FIG. 1 illustrates example scenarios where a segment of video content is played in various display conditions. In the examples illustrated in FIG. 1, the segment of video content may be encoded with a resolution of 640×480. A user of mobile phone 100A is watching a segment of video content 120A on the display 110A of the mobile phone 100A. The mobile phone 100A is on the portrait mode. A dimension of the display 110A of the mobile phone 100A is four inches diagonally. The resolution of the display 110A is 1136×640. Another user of mobile phone 100B is watching the same segment of the video content 120B on the while the display 110B is on the landscape mode. The size and resolution of display 110B is identical to those of display 110A. Although the segment of the video content has been encoded identically, the perceived video quality of 120A may be different from the perceived video quality of 120B. In another example, the segment of video content may be streamed to a television 100C. The display 110C is 21 inches diagonally and the resolution of the display 110C is 1920× 1080. The content 120C is zoomed up on the display to make the content fit to the display. The perceived video quality of 120C may be quite different from the previous scenarios where the content is displayed on a mobile phone display. Although FIG. 1 illustrates example scenarios where video content is displayed on various display conditions, many other factors (e.g., streaming bit rate, jitter, etc.) may affect the perceived video quality.

Figure 2:
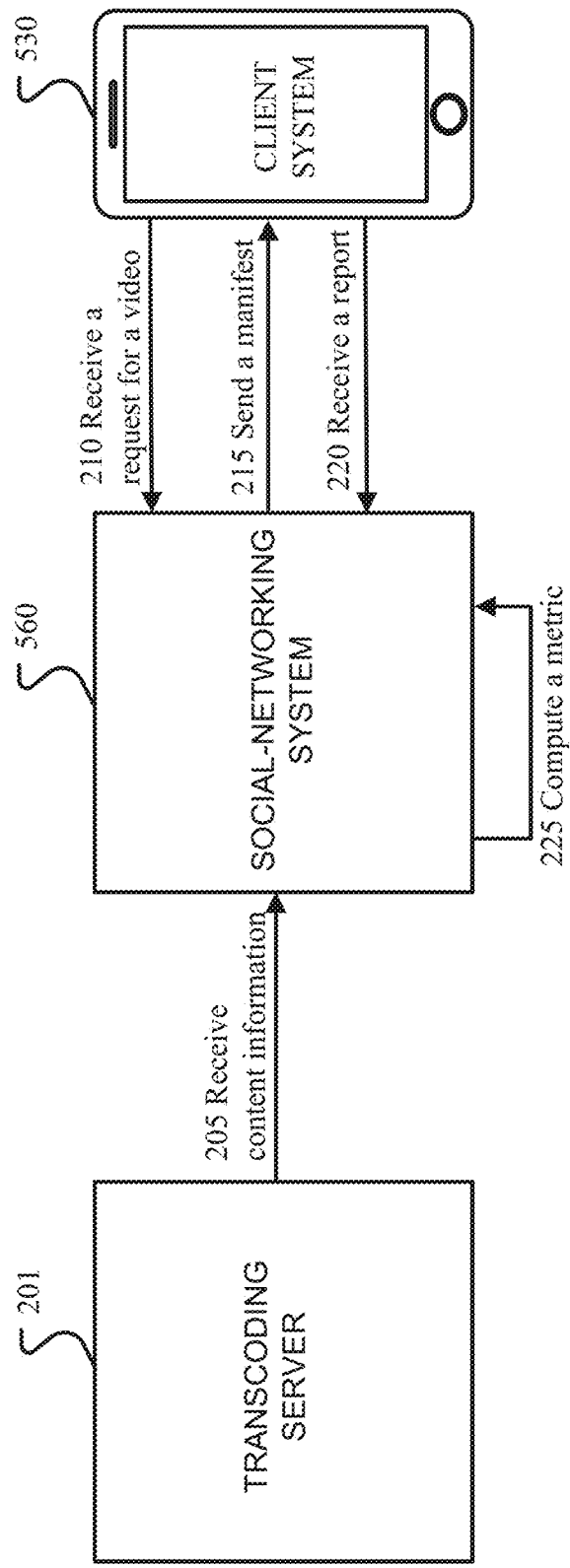
FIG. 2 illustrates an example message flow for computing a HVQ metric.

FIG. 2 illustrates an example message flow for computing a HVQ metric. At step 205, the social-networking system 560 may receive content information from one or more transcoding servers 201. The transcoding servers 201 may split a multimedia content into a plurality of segments and encode each segment. The content information for each segment of the multimedia content may comprise resolution of the segment, content analytics associated with the segment, compression of the segment, encoding format of the segment, compression quality associated with the segment, and any suitable characteristics associated with the segment. At step 210, the social-networking system 560 may receive a request for the multimedia content from a client system 530. At step 215, the social-networking system 560 may send a manifest associated with the requested multimedia content, where the manifest comprises information describing the location of segments of the multimedia content. The manifest may further comprise resolution, byte-range of segments, number of segments, total duration and any suitable information associated with the multimedia content. The client system 530 may download a segment of the multimedia content based on the provided manifest. At step 220, the social-networking system 560 may receive a report from the client system 530, where the report comprises playback information. The playback information may comprise bit rate associated with viewing of the segment of the multimedia content, dimension of the display associated with the client system 530, orientation of the display associated with the viewing of the segment of the multimedia content, resolution of display associated with the client system 530, viewing interface associated with the viewing of the segment of the multimedia content, and any suitable parameters associated with the viewing of the segment of the multimedia content. In particular embodiments, the social-networking system 560 may obtain the playback information in another way other than receiving from the client system 530. At step 225, the social-networking system 560 may compute a HVQ metric based on collected content information, playback information, and any suitable collected information associated with streaming the segment to the client system 530. The social-networking system 560 may send another manifest to the client system 530 based on the received report. The social-networking system 560 may continue computing a HVQ metric for each downloaded segment of the multimedia content until the client system 530 stops viewing. Although this disclosure describes and illustrates a particular sequence of message exchanges for computing a HVQ metric in FIG. 2, this disclosure contemplates any suitable sequence of message exchanges for computing a HVQ metric.

In particular embodiments, the social-networking system 560 may receive content information associated with at least one segment of a multimedia content. The content information may be received from one or more transcoding servers 201. The content information may comprise resolution of the at least one segment of the multimedia content, content analytics associated with the at least one segment of the multimedia content, compression of the at least one segment of the multimedia content, encoding format of the at least one segment of the multimedia content, compression quality associated with the at least one segment of the multimedia content, or any suitable characteristics associated with the at least one segment of the multimedia content. For a given multimedia file, the one or more transcoding servers 201 may split the multimedia file into a series of segments and produce a plurality of encoded versions (e.g., low-definition (LD), medium-definition (MD), high-definition (HD), etc.) with various encoding and compression parameters for each segment. When the multimedia content is streamed to a client device, an appropriate version may be selected based on available bandwidth. The one or more transcoding servers 201 may provide content information for each produced encoded version of a segment to the social-networking system 560. In particular embodiments, the one or more transcoding servers 201 may collocate with the social-networking system 560. As an example and not by way of limitation, Alice, an online social network user, may upload a video clip to the social-networking system 560. On receiving the video clip, the social-networking system 560 may command a transcoding server 201 to encode the video clip. The transcoding server 201 may split the uploaded video clip into a plurality of segments and produce three different encoded versions for each segment: LD, MD, and HD. The transcoding server 201 may send content information for each encoded version to the social-networking system 560. The social-networking system 560 may generate manifests based on the received content information. Although this disclosure describes receiving content information for a segment of multimedia content in a particular manner, this disclosure contemplates receiving content information for a segment of multimedia content in any suitable manner.

The social-networking system 560 may receive a request to view a segment of the multimedia content from a client device. A user of the online social network may want to access a multimedia content available on the online social network. A client system 530 associated with the user may send a request to initiate streaming of the multimedia content to the social-networking system 560. If the multimedia content comprises a series of segments, the client system 530 may send a request per each segment of the multimedia content. As an example and not by way of limitation, continuing with the prior example, Bob, a friend of Alice in the online social network, may want to watch the video clip that Alice uploaded while Bob is browsing his newsfeed on the online social network. Bob may click the video clip. The client system 530 associated with Bob may send a request to initiate streaming of the first segment of the video clip to the social-networking system 560. Although this disclosure describes receiving a request to view a segment of the multimedia content in a particular manner, this disclosure contemplates receiving a request to view a segment of the multimedia content in any suitable manner.

The social-networking system 560 may log playback information associated with the viewing of the segment of the multimedia content. The playback information may comprise bit rate associated with the viewing of the at least one segment of the multimedia content, dimension of the display associated with the client device, orientation of the display associated with the viewing of the at least one segment of the multimedia content, resolution of display associated with the client device, viewing interface associated with the viewing of the at least one segment of the multimedia content, or any suitable characteristics associated with the viewing of the at least one segment of the multimedia content. In particular embodiments, the social-networking system 560 may receive a report from the client system 530 at the end of downloading a segment of the multimedia content. The client system 530 may include download bit rate in the report. The client system 530 may also include detailed information about the display device on which the segment of multimedia content is presented. The detailed information may include the dimension of the display, the resolution of the display, the orientation of the display while the segment of the multimedia content is being displayed, and any suitable information in the report. The client system 530 may also include viewing interface (e.g., a particular media player, a web browser, etc.) in the report. The social-networking system 560 may log the received playback information. The user associated with the client system 530 may pause the streaming, fast-forward the viewing, rewind the viewing, or jump to a particular position of the multimedia content. The client system 530 may report such events to the social-networking system 560. The social-networking system 560 may log received events as a part of the playback information. In particular embodiments, the social-networking system 560 may obtain the playback information in any other suitable way. The playback information may comprise download bit rate. The social-networking system 560 may choose an appropriate encoded version for the next segment of the multimedia content based on the download bit rate and other information from the playback information, and provide the corresponding manifest for the next segment to the client system 530. As an example and not by way of limitation, continuing with the prior example, the client system 530 Bob uses may be a mobile phone with 4 inch 1136×640 display. Bob may watch the first segment of the video clip using the web browser installed on the mobile phone with the landscape mode display. The bit rate for downloading the first segment of the video clip may be 10 Mbps. The client system 530 associated with Bob may send a report at the end of downloading the first segment of the video clip including such details. Although this disclosure describes logging playback information associated with the viewing of a segment of the multimedia content in a particular manner, this disclosure contemplates logging playback information associated with the viewing of a segment of the multimedia content in any suitable manner.

The social-networking system 560 may determine a High Video Quality (HVQ) metric associated with the segment of multimedia content based in part upon a portion of the received content information and a portion of the logged playback information. The social-networking system 560 may take content information into account when the social-networking system 560 determines the HVQ metric for the segment. If the resolution of the segment is high, the probability of the segment of the multimedia content being perceived as high quality by the user would be high. A compression quality or compression efficiency may indicate how good the encoded version is compared to the original. The compression quality or compression efficiency may be another important factor affecting the user perception. Class of content available in the content analytics may also affect user perception. For example, a high-motion content may be perceived differently by the users than a low-motion content. Also, an animation content may be perceived differently than a live action content. The social-networking system 560 may also take playback information into account when the social-networking system 560 determines the HVQ metric for the segment. The download bit rate may be an important factor for the user perception because a high bit rate may allow the user to watch the content with minimal delay. The dimension and resolution of the display may be another important factor for the user perception. Generally, a large and high-resolution display may require a higher definition content for the user to consider the content high quality. As an example and not by way of limitation, continuing with the prior example, the social-networking system 560 may compute a HVQ metric for the first segment of the video clip after receiving the report from the client system 530 associated with Bob. The social-networking system 560 may take the playback information received from the client system 530 as well as the content information received from the transcoding server 201 into account to compute the HVQ metric. Although this disclosure describes determining a HVQ metric associated with a segment of multimedia content in a particular manner, this disclosure contemplates determining a HVQ metric associated with a segment of multimedia content in any suitable manner.

Figure 3:
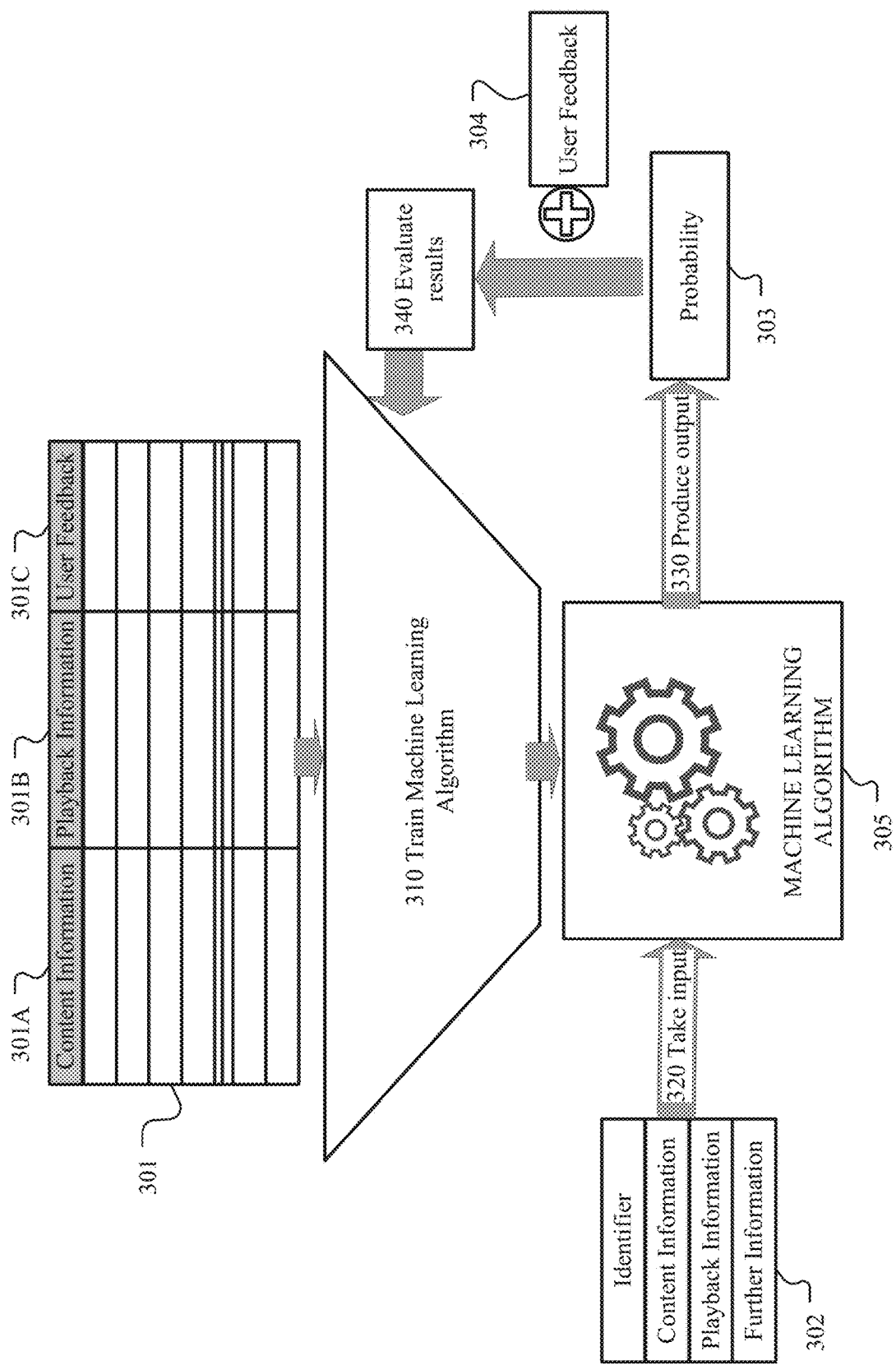
FIG. 3 illustrates an example Machine Learning architecture for determining HVQ metrics.

FIG. 3 illustrates an example Machine Learning architecture for determining HVQ metrics. The social-networking system 560 may prepare a large collection of training data 301. The training data may comprise content information 301A, playback information 301B and corresponding user feedback 301C for each instance of streaming of a segment. In case user feedback is not available, the social-networking system 560 may estimate the user perceived video quality based on any available estimation algorithms. The estimated user perceived video quality may be used instead of user feedback 301C. At 310, the social-networking system 560 may train an ML algorithm 305 with the collected training data 301. The ML algorithm 305 may be used for determining a probability that a segment of a multimedia content is perceived as high quality by the user. At step 320, the social-networking system 560 may provide a set of data for a segment streaming instance 302 to the ML algorithm 305. The set of data for a segment streaming instance 302 may comprise an identifier of a segment streaming instance and corresponding content information, playback information, and any further information. At step 330, the ML algorithm may produce a probability 303 that the given segment streaming is perceived as high quality by the user. If the social-networking system 560 receives a feedback 304 from the user for the given segment streaming, the social-networking system 560 may evaluate whether or not the produced probability was accurate at step 340. The social-networking system 560 may further train the ML algorithm with the evaluated results in order to enhance the performance of the ML algorithm.

In particular embodiments, the social-networking system 560 may utilize Machine Learning (ML) techniques to determine the HVQ metric. The social-networking system 560 may collect a large collection of multimedia content streaming records 301. The social-networking system 560 may train a ML model with the collection of multimedia content streaming records 301. A multimedia content streaming record may comprise collected content information for the segment 301A, collected playback information 301B, and feedback received from the user 301C. As an example and not by way of limitation, the social-networking system 560 may receive content information from a transcoding server 201 for a segment of multimedia content. The social-networking system 560 may receive a report comprising playback information from a client system 530 at the end of streaming the segment to the client system 530. At the end of the streaming, the user may fill up a survey form regarding the video quality where the user chooses the quality score between 1 and 10. The social-networking system 560 may record the content information, playback information, and the user feedback. The social-networking system 560 may train an ML algorithm for determining a probability that a user perceives a streamed segment of multimedia content as high quality with the collected records 301. Although this disclosure describes training an ML algorithm with a large collection of multimedia content streaming records in a particular manner, this disclosure contemplates training an ML algorithm with a large collection of multimedia content streaming records in any suitable manner.

The social-networking system 560 may classify a segment of the multimedia content with the HVQ metric. The social-networking system 560 may determine that the segment of the multimedia content is a high-quality segment by comparing the HVQ metric with a threshold. The threshold may comprise an adaptive threshold based in part upon a geographical region associated with the client device. In a developing country, users' expectation for the quality of multimedia contents may be low because the users get used to narrow bandwidth. On the contrary, users in a developed country may expect better quality of streaming contents. As an example and not by way of limitation, the social-networking system 560 may gather content information associated with a segment of multimedia content. The social-networking system 560 may receive a report from a client system 530 at the end of streaming the segment to the client system 530. The report may comprise playback information. The social-networking system 560 may provide the content information and the playback information to the ML algorithm as input. The ML algorithm may produce a probability that the streamed content is perceived as high quality by the user as an output from the ML algorithm. The social-networking system 560 may compare the probability to a threshold to classify whether or not the segment of the multimedia content is high quality content. In particular embodiments, the ML algorithm may produce a binary result indicating whether or not the segment of the multimedia content is high quality instead of a probability. Although this disclosure describes classifying a segment of the multimedia content with the HVQ metric in a particular manner, this disclosure contemplates classifying a segment of the multimedia content with the HVQ metric in any suitable manner.

In particular embodiments, the social-networking system 560 may receive feedback associated with the classification of a segment of the multimedia content and update a calculation used to determine the HVQ metric. In particular embodiments, the user may fill up a survey form regarding the video quality where the user scores the quality of the streaming at the end of the streaming. In particular embodiments, the user may click 'good quality' button indicating that the user is satisfied with the quality of the streaming at the end of the streaming. The social-networking system 560 may compare those feedback with the classification based on computed HVQ metric. In case the user feedback does not agree with the classification, the social-networking system 560 may update the calculation used to determine the HVQ metric. If the social-networking system 560 utilizes an ML algorithm for determining the HVQ metric, the social-networking system 560 may train the ML algorithm with the user feedback along with content information and playback information. As an example and not by way of limitation, the social-networking system 560 may compute a HVQ metric using the ML algorithm. The social-networking system 560 may classify the streaming by comparing the computed HVQ metric with a pre-determined threshold for the given geographic area. The social-networking system 560 may receive a user feedback indicating the user perceived streaming quality. The social-networking system 560 may train the ML algorithm with the received user feedback along with content information and playback information corresponding to the streaming. Although this disclosure describes updating a calculation used to determine the HVQ metric based on received user feedback in a particular manner, this disclosure contemplates updating a calculation used to determine the HVQ metric based on received user feedback in any suitable manner.

Figure 4:
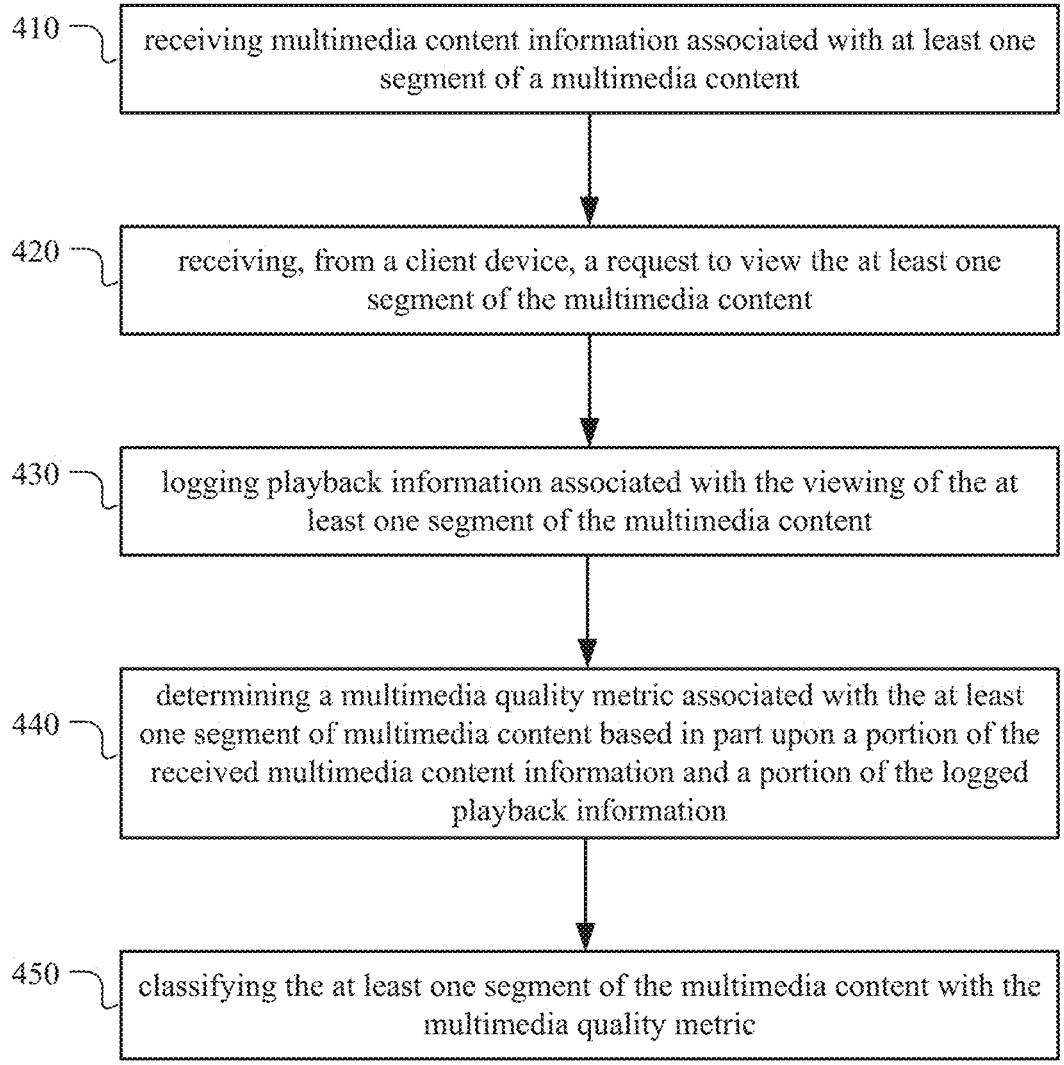
FIG. 4 illustrates an example method for determining a HVQ metric.

FIG. 4 illustrates an example method 400 for determining a HVQ metric. The method may begin at step 410, where the social-networking system 560 may receive multimedia content information associated with at least one segment of a multimedia content. At step 420, the social-networking system 560 may receive, from a client device, a request to view the at least one segment of the multimedia content. At step 430, the social-networking system 560 may log playback information associated with the viewing of the at least one segment of the multimedia content. At step 440, the social-networking system 560 may determine a multimedia quality metric associated with the at least one segment of multimedia content based in part upon a portion of the received multimedia content information and a portion of the logged playback information. At step 450, the social-networking system 560 may classify the at least one segment of the multimedia content with the multimedia quality metric. Particular embodiments may repeat one or more steps of the method of FIG. 4, where appropriate. Although this disclosure describes and illustrates particular steps of the method of FIG. 4 as occurring in a particular order, this disclosure contemplates any suitable steps of the method of FIG. 4 occurring in any suitable order. Moreover, although this disclosure describes and illustrates an example method for determining a HVQ metric including the particular steps of the method of FIG. 4, this disclosure contemplates any suitable method for determining a HVQ metric including any suitable steps, which may include all, some, or none of the steps of the method of FIG. 4, where appropriate. Furthermore, although this disclosure describes and illustrates particular components, devices, or systems carrying out particular steps of the method of FIG. 4, this disclosure contemplates any suitable combination of any suitable components, devices, or systems carrying out any suitable steps of the method of FIG. 4.

System Overview

Figure 5:
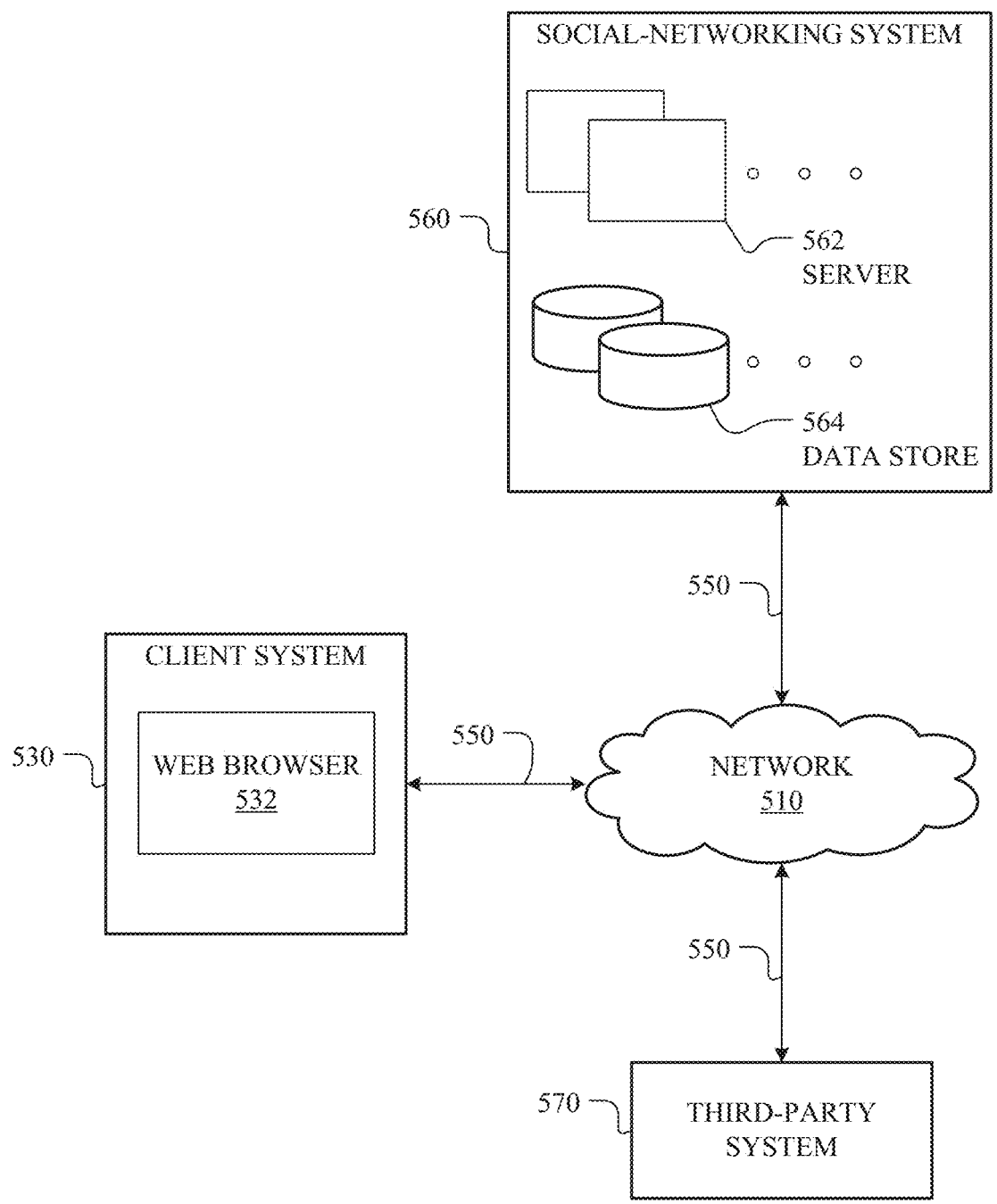
FIG. 5 illustrates an example network environment associated with a social-networking system.

FIG. 5 illustrates an example network environment 500 associated with a social-networking system. Network environment 500 includes a client system 530, a social-networking system 560, and a third-party system 570 connected to each other by a network 510. Although FIG. 5 illustrates a particular arrangement of client system 530, social-networking system 560, third-party system 570, and network 510, this disclosure contemplates any suitable arrangement of client system 530, social-networking system 560, third-party system 570, and network 510. As an example and not by way of limitation, two or more of client system 530, social-networking system 560, and third-party system 570 may be connected to each other directly, bypassing network 510. As another example, two or more of client system 530, social-networking system 560, and third-party system 570 may be physically or logically co-located with each other in whole or in part. Moreover, although FIG. 5 illustrates a particular number of client systems 530, social-networking systems 560, third-party systems 570, and networks 510, this disclosure contemplates any suitable number of client systems 530, social-networking systems 560, third-party systems 570, and networks 510. As an example and not by way of limitation, network environment 500 may include multiple client system 530, social-networking systems 560, third-party systems 570, and networks 510.

This disclosure contemplates any suitable network 510. As an example and not by way of limitation, one or more portions of network 510 may include an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, or a combination of two or more of these. Network 510 may include one or more networks 510.

Links 550 may connect client system 530, social-networking system 560, and third-party system 570 to communication network 510 or to each other. This disclosure contemplates any suitable links 550. In particular embodiments, one or more links 550 include one or more wireline (such as for example Digital Subscriber Line (DSL) or Data Over Cable Service Interface Specification (DOCSIS)), wireless (such as for example Wi-Fi or Worldwide Interoperability for Microwave Access (WiMAX)), or optical (such as for example Synchronous Optical Network (SONET) or Synchronous Digital Hierarchy (SDH)) links. In particular embodiments, one or more links 550 each include an ad hoc network, an intranet, an extranet, a VPN, a LAN, a WLAN, a WAN, a WWAN, a MAN, a portion of the Internet, a portion of the PSTN, a cellular technology-based network, a satellite communications technology-based network, another link 550, or a combination of two or more such links 550. Links 550 need not necessarily be the same throughout network environment 500. One or more first links 550 may differ in one or more respects from one or more second links 550.

In particular embodiments, client system 530 may be an electronic device including hardware, software, or embedded logic components or a combination of two or more such components and capable of carrying out the appropriate functionalities implemented or supported by client system 530. As an example and not by way of limitation, a client system 530 may include a computer system such as a desktop computer, notebook or laptop computer, netbook, a tablet computer, e-book reader, GPS device, camera, personal digital assistant (PDA), handheld electronic device, cellular telephone, smartphone, augmented/virtual reality device, other suitable electronic device, or any suitable combination thereof. This disclosure contemplates any suitable client systems 530. A client system 530 may enable a network user at client system 530 to access network 510. A client system 530 may enable its user to communicate with other users at other client systems 530.

In particular embodiments, client system 530 may include a web browser 532, such as MICROSOFT INTERNET EXPLORER, GOOGLE CHROME or MOZILLA FIREFOX, and may have one or more add-ons, plug-ins, or other extensions, such as TOOLBAR or YAHOO TOOLBAR. A user at client system 530 may enter a Uniform Resource Locator (URL) or other address directing the web browser 532 to a particular server (such as server 562, or a server associated with a third-party system 570), and the web browser 532 may generate a Hyper Text Transfer Protocol (HTTP) request and communicate the HTTP request to server. The server may accept the HTTP request and communicate to client system 530 one or more Hyper Text Markup Language (HTML) files responsive to the HTTP request. Client system 530 may render a webpage based on the HTML files from the server for presentation to the user. This disclosure contemplates any suitable webpage files. As an example and not by way of limitation, webpages may render from HTML files, Extensible Hyper Text Markup Language (XHTML) files, or Extensible Markup Language (XML) files, according to particular needs. Such pages may also execute scripts such as, for example and without limitation, those written in JAVASCRIPT, JAVA, MICROSOFT SILVERLIGHT, combinations of markup language and scripts such as AJAX (Asynchronous JAVASCRIPT and XML), and the like. Herein, reference to a webpage encompasses one or more corresponding webpage files (which a browser may use to render the webpage) and vice versa, where appropriate.

In particular embodiments, social-networking system 560 may be a network-addressable computing system that can host an online social network. Social-networking system 560 may generate, store, receive, and send social-networking data, such as, for example, user-profile data, concept-profile data, social-graph information, or other suitable data related to the online social network. Social-networking system 560 may be accessed by the other components of network environment 500 either directly or via network 510. As an example and not by way of limitation, client system 530 may access social-networking system 560 using a web browser 532, or a native application associated with social-networking system 560 (e.g., a mobile social-networking application, a messaging application, another suitable application, or any combination thereof) either directly or via network 510. In particular embodiments, social-networking system 560 may include one or more servers 562. Each server 562 may be a unitary server or a distributed server spanning multiple computers or multiple datacenters. Servers 562 may be of various types, such as, for example and without limitation, web server, news server, mail server, message server, advertising server, file server, application server, exchange server, database server, proxy server, another server suitable for performing functions or processes described herein, or any combination thereof. In particular embodiments, each server 562 may include hardware, software, or embedded logic components or a combination of two or more such components for carrying out the appropriate functionalities implemented or supported by server 562. In particular embodiments, social-networking system 560 may include one or more data stores 564. Data stores 564 may be used to store various types of information. In particular embodiments, the information stored in data stores 564 may be organized according to specific data structures. In particular embodiments, each data store 564 may be a relational, columnar, correlation, or other suitable database. Although this disclosure describes or illustrates particular types of databases, this disclosure contemplates any suitable types of databases. Particular embodiments may provide interfaces that enable a client system 530, a social-networking system 560, or a third-party system 570 to manage, retrieve, modify, add, or delete, the information stored in data store 564.

In particular embodiments, social-networking system 560 may store one or more social graphs in one or more data stores 564. In particular embodiments, a social graph may include multiple nodes—which may include multiple user nodes (each corresponding to a particular user) or multiple concept nodes (each corresponding to a particular concept)—and multiple edges connecting the nodes. Social-networking system 560 may provide users of the online social network the ability to communicate and interact with other users. In particular embodiments, users may join the online social network via social-networking system 560 and then add connections (e.g., relationships) to a number of other users of social-networking system 560 to whom they want to be connected. Herein, the term "friend" may refer to any other user of social-networking system 560 with whom a user has formed a connection, association, or relationship via social-networking system 560.

In particular embodiments, social-networking system 560 may provide users with the ability to take actions on various types of items or objects, supported by social-networking system 560. As an example and not by way of limitation, the items and objects may include groups or social networks to which users of social-networking system 560 may belong, events or calendar entries in which a user might be interested, computer-based applications that a user may use, transactions that allow users to buy or sell items via the service, interactions with advertisements that a user may perform, or other suitable items or objects. A user may interact with anything that is capable of being represented in social-networking system 560 or by an external system of third-party system 570, which is separate from social-networking system 560 and coupled to social-networking system 560 via a network 510.

In particular embodiments, social-networking system 560 may be capable of linking a variety of entities. As an example and not by way of limitation, social-networking system 560 may enable users to interact with each other as well as receive content from third-party systems 570 or other entities, or to allow users to interact with these entities through an application programming interfaces (API) or other communication channels.

In particular embodiments, a third-party system 570 may include one or more types of servers, one or more data stores, one or more interfaces, including but not limited to APIs, one or more web services, one or more content sources, one or more networks, or any other suitable components, e.g., that servers may communicate with. A third-party system 570 may be operated by a different entity from an entity operating social-networking system 560. In particular embodiments, however, social-networking system 560 and third-party systems 570 may operate in conjunction with each other to provide social-networking services to users of social-networking system 560 or third-party systems 570. In this sense, social-networking system 560 may provide a platform, or backbone, which other systems, such as third-party systems 570, may use to provide social-networking services and functionality to users across the Internet.

In particular embodiments, a third-party system 570 may include a third-party content object provider. A third-party content object provider may include one or more sources of content objects, which may be communicated to a client system 530. As an example and not by way of limitation, content objects may include information regarding things or activities of interest to the user, such as, for example, movie show times, movie reviews, restaurant reviews, restaurant menus, product information and reviews, or other suitable information. As another example and not by way of limitation, content objects may include incentive content objects, such as coupons, discount tickets, gift certificates, or other suitable incentive objects.

In particular embodiments, social-networking system 560 also includes user-generated content objects, which may enhance a user's interactions with social-networking system 560. User-generated content may include anything a user can add, upload, send, or "post" to social-networking system 560. As an example and not by way of limitation, a user communicates posts to social-networking system 560 from a client system 530. Posts may include data such as status updates or other textual data, location information, photos, videos, links, music or other similar data or media. Content may also be added to social-networking system 560 by a third-party through a "communication channel," such as a newsfeed or stream.

In particular embodiments, social-networking system 560 may include a variety of servers, sub-systems, programs, modules, logs, and data stores. In particular embodiments, social-networking system 560 may include one or more of the following: a web server, action logger, API-request server, relevance-and-ranking engine, content-object classifier, notification controller, action log, third-party-content-object-exposure log, inference module, authorization/privacy server, search module, advertisement-targeting module, user-interface module, user-profile store, connection store, third-party content store, or location store. Social-networking system 560 may also include suitable components such as network interfaces, security mechanisms, load balancers, failover servers, management-and-network-operations consoles, other suitable components, or any suitable combination thereof. In particular embodiments, social-networking system 560 may include one or more user-profile stores for storing user profiles. A user profile may include, for example, biographic information, demographic information, behavioral information, social information, or other types of descriptive information, such as work experience, educational history, hobbies or preferences, interests, affinities, or location. Interest information may include interests related to one or more categories. Categories may be general or specific. As an example and not by way of limitation, if a user "likes" an article about a brand of shoes the category may be the brand, or the general category of "shoes" or "clothing." A connection store may be used for storing connection information about users. The connection information may indicate users who have similar or common work experience, group memberships, hobbies, educational history, or are in any way related or share common attributes. The connection information may also include user-defined connections between different users and content (both internal and external). A web server may be used for linking social-networking system 560 to one or more client systems 530 or one or more third-party system 570 via network 510. The web server may include a mail server or other messaging functionality for receiving and routing messages between social-networking system 560 and one or more client systems 530. An API-request server may allow a third-party system 570 to access information from social-networking system 560 by calling one or more APIs. An action logger may be used to receive communications from a web server about a user's actions on or off social-networking system 560. In conjunction with the action log, a third-party-content-object log may be maintained of user exposures to third-party-content objects. A notification controller may provide information regarding content objects to a client system 530. Information may be pushed to a client system 530 as notifications, or information may be pulled from client system 530 responsive to a request received from client system 530. Authorization servers may be used to enforce one or more privacy settings of the users of social-networking system 560. A privacy setting of a user determines how particular information associated with a user can be shared. The authorization server may allow users to opt in to or opt out of having their actions logged by social-networking system 560 or shared with other systems (e.g., third-party system 570), such as, for example, by setting appropriate privacy settings. Third-party-content-object stores may be used to store content objects received from third parties, such as a third-party system 570. Location stores may be used for storing location information received from client systems 530 associated with users. Advertisement-pricing modules may combine social information, the current time, location information, or other suitable information to provide relevant advertisements, in the form of notifications, to a user.

Social Graphs

Figure 6:
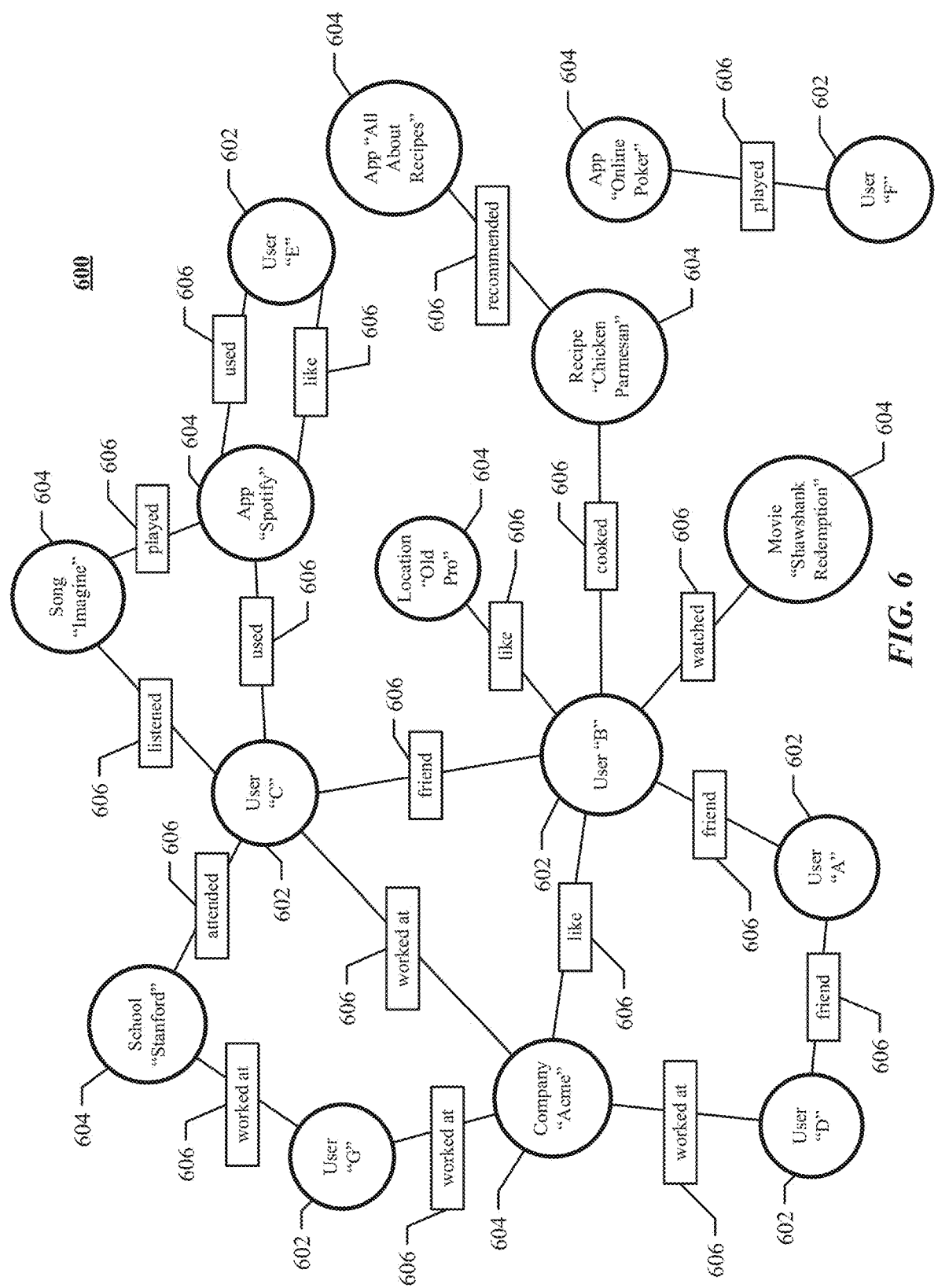
FIG. 6 illustrates an example social graph.

FIG. 6 illustrates example social graph 600. In particular embodiments, social-networking system 560 may store one or more social graphs 600 in one or more data stores. In particular embodiments, social graph 600 may include multiple nodes—which may include multiple user nodes 602 or multiple concept nodes 604—and multiple edges 606 connecting the nodes. Example social graph 600 illustrated in FIG. 6 is shown, for didactic purposes, in a two-dimensional visual map representation. In particular embodiments, a social-networking system 560, client system 530, or third-party system 570 may access social graph 600 and related social-graph information for suitable applications. The nodes and edges of social graph 600 may be stored as data objects, for example, in a data store (such as a social-graph database). Such a data store may include one or more searchable or queryable indexes of nodes or edges of social graph 600.

In particular embodiments, a user node 602 may correspond to a user of social-networking system 560. As an example and not by way of limitation, a user may be an individual (human user), an entity (e.g., an enterprise, business, or third-party application), or a group (e.g., of individuals or entities) that interacts or communicates with or over social-networking system 560. In particular embodiments, when a user registers for an account with social-networking system 560, social-networking system 560 may create a user node 602 corresponding to the user, and store the user node 602 in one or more data stores. Users and user nodes 602 described herein may, where appropriate, refer to registered users and user nodes 602 associated with registered users. In addition or as an alternative, users and user nodes 602 described herein may, where appropriate, refer to users that have not registered with social-networking system 560. In particular embodiments, a user node 602 may be associated with information provided by a user or information gathered by various systems, including social-networking system 560. As an example and not by way of limitation, a user may provide his or her name, profile picture, contact information, birth date, sex, marital status, family status, employment, education background, preferences, interests, or other demographic information. In particular embodiments, a user node 602 may be associated with one or more data objects corresponding to information associated with a user. In particular embodiments, a user node 602 may correspond to one or more webpages.

In particular embodiments, a concept node 604 may correspond to a concept. As an example and not by way of limitation, a concept may correspond to a place (such as, for example, a movie theater, restaurant, landmark, or city); a website (such as, for example, a website associated with social-network system 560 or a third-party website associated with a web-application server); an entity (such as, for example, a person, business, group, sports team, or celebrity); a resource (such as, for example, an audio file, video file, digital photo, text file, structured document, or application) which may be located within social-networking system 560 or on an external server, such as a web-application server; real or intellectual property (such as, for example, a sculpture, painting, movie, game, song, idea, photograph, or written work); a game; an activity; an idea or theory; an object in a augmented/virtual reality environment; another suitable concept; or two or more such concepts. A concept node 604 may be associated with information of a concept provided by a user or information gathered by various systems, including social-networking system 560. As an example and not by way of limitation, information of a concept may include a name or a title; one or more images (e.g., an image of the cover page of a book); a location (e.g., an address or a geographical location); a website (which may be associated with a URL); contact information (e.g., a phone number or an email address); other suitable concept information; or any suitable combination of such information. In particular embodiments, a concept node 604 may be associated with one or more data objects corresponding to information associated with concept node 604. In particular embodiments, a concept node 604 may correspond to one or more webpages.

In particular embodiments, a node in social graph 600 may represent or be represented by a webpage (which may be referred to as a "profile page"). Profile pages may be hosted by or accessible to social-networking system 560. Profile pages may also be hosted on third-party websites associated with a third-party system 570. As an example and not by way of limitation, a profile page corresponding to a particular external webpage may be the particular external webpage and the profile page may correspond to a particular concept node 604. Profile pages may be viewable by all or a selected subset of other users. As an example and not by way of limitation, a user node 602 may have a corresponding user-profile page in which the corresponding user may add content, make declarations, or otherwise express himself or herself. As another example and not by way of limitation, a concept node 604 may have a corresponding concept-profile page in which one or more users may add content, make declarations, or express themselves, particularly in relation to the concept corresponding to concept node 604.

In particular embodiments, a concept node 604 may represent a third-party webpage or resource hosted by a third-party system 570. The third-party webpage or resource may include, among other elements, content, a selectable or other icon, or other inter-actable object (which may be implemented, for example, in JavaScript, AJAX, or PHP codes) representing an action or activity. As an example and not by way of limitation, a third-party webpage may include a selectable icon such as "like," "check-in," "eat," "recommend," or another suitable action or activity. A user viewing the third-party webpage may perform an action by selecting one of the icons (e.g., "check-in"), causing a client system 530 to send to social-networking system 560 a message indicating the user's action. In response to the message, social-networking system 560 may create an edge (e.g., a check-in-type edge) between a user node 602 corresponding to the user and a concept node 604 corresponding to the third-party webpage or resource and store edge 606 in one or more data stores.

In particular embodiments, a pair of nodes in social graph 600 may be connected to each other by one or more edges 606. An edge 606 connecting a pair of nodes may represent a relationship between the pair of nodes. In particular embodiments, an edge 606 may include or represent one or more data objects or attributes corresponding to the relationship between a pair of nodes. As an example and not by way of limitation, a first user may indicate that a second user is a "friend" of the first user. In response to this indication, social-networking system 560 may send a "friend request" to the second user. If the second user confirms the "friend request," social-networking system 560 may create an edge 606 connecting the first user's user node 602 to the second user's user node 602 in social graph 600 and store edge 606 as social-graph information in one or more of data stores 564. In the example of FIG. 6, social graph 600 includes an edge 606 indicating a friend relation between user nodes 602 of user "A" and user "B" and an edge indicating a friend relation between user nodes 602 of user "C" and user "B." Although this disclosure describes or illustrates particular edges 606 with particular attributes connecting particular user nodes 602, this disclosure contemplates any suitable edges 606 with any suitable attributes connecting user nodes 602. As an example and not by way of limitation, an edge 606 may represent a friendship, family relationship, business or employment relationship, fan relationship (including, e.g., liking, etc.), follower relationship, visitor relationship (including, e.g., accessing, viewing, checking-in, sharing, etc.), subscriber relationship, superior/subordinate relationship, reciprocal relationship, non-reciprocal relationship, another suitable type of relationship, or two or more such relationships. Moreover, although this disclosure generally describes nodes as being connected, this disclosure also describes users or concepts as being connected. Herein, references to users or concepts being connected may, where appropriate, refer to the nodes corresponding to those users or concepts being connected in social graph 600 by one or more edges 606. The degree of separation between two objects represented by two nodes, respectively, is a count of edges in a shortest path connecting the two nodes in the social graph 600. As an example and not by way of limitation, in the social graph 600, the user node 602 of user "C" is connected to the user node 602 of user "A" via multiple paths including, for example, a first path directly passing through the user node 602 of user "B," a second path passing through the concept node 604 of company "Acme" and the user node 602 of user "D," and a third path passing through the user nodes 602 and concept nodes 604 representing school "Stanford," user "G," company "Acme," and user "D." User "C" and user "A" have a degree of separation of two because the shortest path connecting their corresponding nodes (i.e., the first path) includes two edges 606.

In particular embodiments, an edge 606 between a user node 602 and a concept node 604 may represent a particular action or activity performed by a user associated with user node 602 toward a concept associated with a concept node 604. As an example and not by way of limitation, as illustrated in FIG. 6, a user may "like," "attended," "played," "listened," "cooked," "worked at," or "watched" a concept, each of which may correspond to an edge type or subtype. A concept-profile page corresponding to a concept node 604 may include, for example, a selectable "check in" icon (such as, for example, a clickable "check in" icon) or a selectable "add to favorites" icon. Similarly, after a user clicks these icons, social-networking system 560 may create a "favorite" edge or a "check in" edge in response to a user's action corresponding to a respective action. As another example and not by way of limitation, a user (user "C") may listen to a particular song ("Imagine") using a particular application (SPOTIFY, which is an online music application). In this case, social-networking system 560 may create a "listened" edge 606 and a "used" edge (as illustrated in FIG. 6) between user nodes 602 corresponding to the user and concept nodes 604 corresponding to the song and application to indicate that the user listened to the song and used the application. Moreover, social-networking system 560 may create a "played" edge 606 (as illustrated in FIG. 6) between concept nodes 604 corresponding to the song and the application to indicate that the particular song was played by the particular application. In this case, "played" edge 606 corresponds to an action performed by an external application (SPOTIFY) on an external audio file (the song "Imagine"). Although this disclosure describes particular edges 606 with particular attributes connecting user nodes 602 and concept nodes 604, this disclosure contemplates any suitable edges 606 with any suitable attributes connecting user nodes 602 and concept nodes 604. Moreover, although this disclosure describes edges between a user node 602 and a concept node 604 representing a single relationship, this disclosure contemplates edges between a user node 602 and a concept node 604 representing one or more relationships. As an example and not by way of limitation, an edge 606 may represent both that a user likes and has used at a particular concept. Alternatively, another edge 606 may represent each type of relationship (or multiples of a single relationship) between a user node 602 and a concept node 604 (as illustrated in FIG. 6 between user node 602 for user "E" and concept node 604 for "SPOTIFY").

In particular embodiments, social-networking system 560 may create an edge 606 between a user node 602 and a concept node 604 in social graph 600. As an example and not by way of limitation, a user viewing a concept-profile page (such as, for example, by using a web browser or a special-purpose application hosted by the user's client system 530) may indicate that he or she likes the concept represented by the concept node 604 by clicking or selecting a "Like" icon, which may cause the user's client system 530 to send to social-networking system 560 a message indicating the user's liking of the concept associated with the concept-profile page. In response to the message, social-networking system 560 may create an edge 606 between user node 602 associated with the user and concept node 604, as illustrated by "like" edge 606 between the user and concept node 604. In particular embodiments, social-networking system 560 may store an edge 606 in one or more data stores. In particular embodiments, an edge 606 may be automatically formed by social-networking system 560 in response to a particular user action. As an example and not by way of limitation, if a first user uploads a picture, watches a movie, or listens to a song, an edge 606 may be formed between user node 602 corresponding to the first user and concept nodes 604 corresponding to those concepts. Although this disclosure describes forming particular edges 606 in particular manners, this disclosure contemplates forming any suitable edges 606 in any suitable manner.

Systems and Methods

Figure 7:
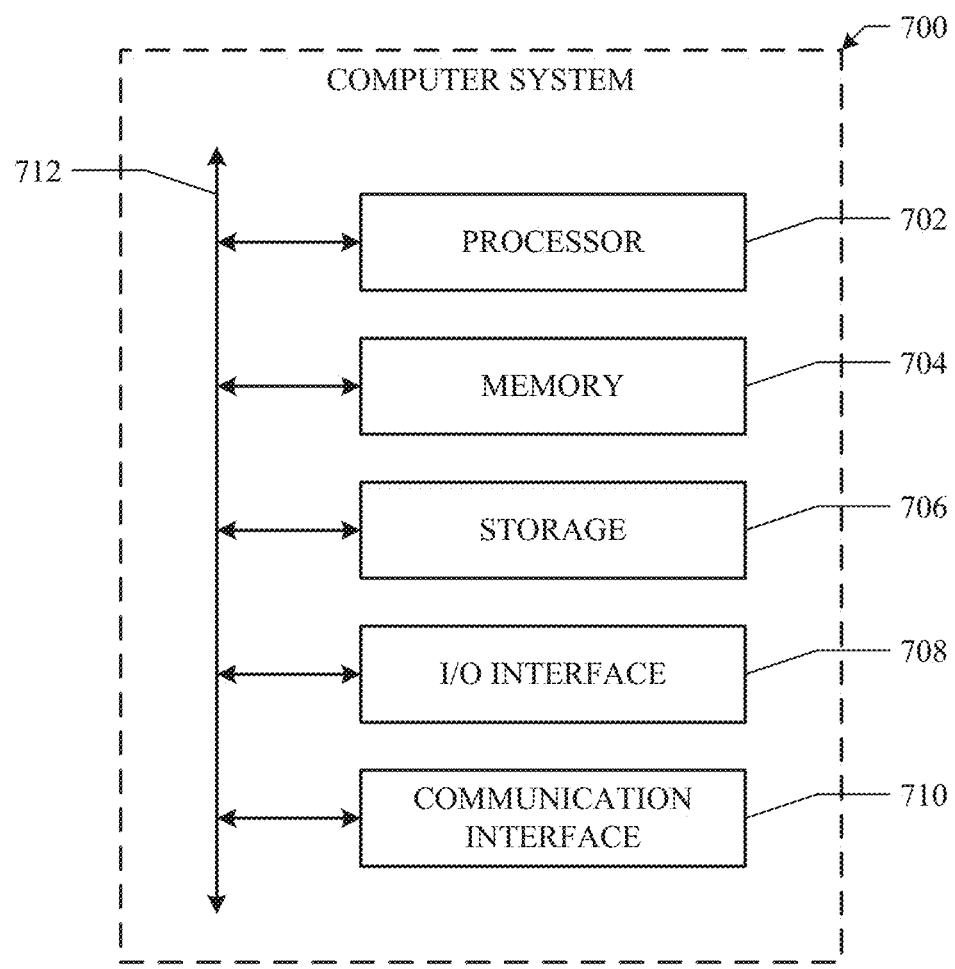
FIG. 7 illustrates an example computer system.

FIG. 7 illustrates an example computer system 700. In particular embodiments, one or more computer systems 700 perform one or more steps of one or more methods described or illustrated herein. In particular embodiments, one or more computer systems 700 provide functionality described or illustrated herein. In particular embodiments, software running on one or more computer systems 700 performs one or more steps of one or more methods described or illustrated herein or provides functionality described or illustrated herein. Particular embodiments include one or more portions of one or more computer systems 700. Herein, reference to a computer system may encompass a computing device, and vice versa, where appropriate. Moreover, reference to a computer system may encompass one or more computer systems, where appropriate.

This disclosure contemplates any suitable number of computer systems 700. This disclosure contemplates computer system 700 taking any suitable physical form. As example and not by way of limitation, computer system 700 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, an augmented/virtual reality device, or a combination of two or more of these. Where appropriate, computer system 700 may include one or more computer systems 700; be unitary or distributed; span multiple locations; span multiple machines; span multiple data centers; or reside in a cloud, which may include one or more cloud components in one or more networks. Where appropriate, one or more computer systems 700 may perform without substantial spatial or temporal limitation one or more steps of one or more methods described or illustrated herein. As an example and not by way of limitation, one or more computer systems 700 may perform in real time or in batch mode one or more steps of one or more methods described or illustrated herein. One or more computer systems 700 may perform at different times or at different locations one or more steps of one or more methods described or illustrated herein, where appropriate.

In particular embodiments, computer system 700 includes a processor 702, memory 704, storage 706, an input/output (I/O) interface 708, a communication interface 710, and a bus 712. Although this disclosure describes and illustrates a particular computer system having a particular number of particular components in a particular arrangement, this disclosure contemplates any suitable computer system having any suitable number of any suitable components in any suitable arrangement.

In particular embodiments, processor 702 includes hardware for executing instructions, such as those making up a computer program. As an example and not by way of limitation, to execute instructions, processor 702 may retrieve (or fetch) the instructions from an internal register, an internal cache, memory 704, or storage 706; decode and execute them; and then write one or more results to an internal register, an internal cache, memory 704, or storage 706. In particular embodiments, processor 702 may include one or more internal caches for data, instructions, or addresses. This disclosure contemplates processor 702 including any suitable number of any suitable internal caches, where appropriate. As an example and not by way of limitation, processor 702 may include one or more instruction caches, one or more data caches, and one or more translation lookaside buffers (TLBs). Instructions in the instruction caches may be copies of instructions in memory 704 or storage 706, and the instruction caches may speed up retrieval of those instructions by processor 702. Data in the data caches may be copies of data in memory 704 or storage 706 for instructions executing at processor 702 to operate on; the results of previous instructions executed at processor 702 for access by subsequent instructions executing at processor 702 or for writing to memory 704 or storage 706; or other suitable data. The data caches may speed up read or write operations by processor 702. The TLBs may speed up virtual-address translation for processor 702. In particular embodiments, processor 702 may include one or more internal registers for data, instructions, or addresses. This disclosure contemplates processor 702 including any suitable number of any suitable internal registers, where appropriate. Where appropriate, processor 702 may include one or more arithmetic logic units (ALUs); be a multi-core processor; or include one or more processors 702. Although this disclosure describes and illustrates a particular processor, this disclosure contemplates any suitable processor.

In particular embodiments, memory 704 includes main memory for storing instructions for processor 702 to execute or data for processor 702 to operate on. As an example and not by way of limitation, computer system 700 may load instructions from storage 706 or another source (such as, for example, another computer system 700) to memory 704. Processor 702 may then load the instructions from memory 704 to an internal register or internal cache. To execute the instructions, processor 702 may retrieve the instructions from the internal register or internal cache and decode them. During or after execution of the instructions, processor 702 may write one or more results (which may be intermediate or final results) to the internal register or internal cache. Processor 702 may then write one or more of those results to memory 704. In particular embodiments, processor 702 executes only instructions in one or more internal registers or internal caches or in memory 704 (as opposed to storage 706 or elsewhere) and operates only on data in one or more internal registers or internal caches or in memory 704 (as opposed to storage 706 or elsewhere). One or more memory buses (which may each include an address bus and a data bus) may couple processor 702 to memory 704. Bus 712 may include one or more memory buses, as described below. In particular embodiments, one or more memory management units (MMUs) reside between processor 702 and memory 704 and facilitate accesses to memory 704 requested by processor 702. In particular embodiments, memory 704 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 704 may include one or more memories 704, where appropriate. Although this disclosure describes and illustrates particular memory, this disclosure contemplates any suitable memory.

In particular embodiments, storage 706 includes mass storage for data or instructions. As an example and not by way of limitation, storage 706 may include a hard disk drive (HDD), a floppy disk drive, flash memory, an optical disc, a magneto-optical disc, magnetic tape, or a Universal Serial Bus (USB) drive or a combination of two or more of these. Storage 706 may include removable or non-removable (or fixed) media, where appropriate. Storage 706 may be internal or external to computer system 700, where appropriate. In particular embodiments, storage 706 is non-volatile, solid-state memory. In particular embodiments, storage 706 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 706 taking any suitable physical form. Storage 706 may include one or more storage control units facilitating communication between processor 702 and storage 706, where appropriate. Where appropriate, storage 706 may include one or more storages 706. Although this disclosure describes and illustrates particular storage, this disclosure contemplates any suitable storage.

In particular embodiments, I/O interface 708 includes hardware, software, or both, providing one or more interfaces for communication between computer system 700 and one or more I/O devices. Computer system 700 may include one or more of these I/O devices, where appropriate. One or more of these I/O devices may enable communication between a person and computer system 700. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 708 for them. Where appropriate, I/O interface 708 may include one or more device or software drivers enabling processor 702 to drive one or more of these I/O devices. I/O interface

708 may include one or more I/O interfaces 708, where appropriate. Although this disclosure describes and illustrates a particular I/O interface, this disclosure contemplates any suitable I/O interface.

In particular embodiments, communication interface 710 includes hardware, software, or both providing one or more interfaces for communication (such as, for example, packet-based communication) between computer system 700 and one or more other computer systems 700 or one or more networks. As an example and not by way of limitation, communication interface 710 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 710 for it. As an example and not by way of limitation, computer system 700 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 700 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 700 may include any suitable communication interface 710 for any of these networks, where appropriate. Communication interface 710 may include one or more communication interfaces 710, where appropriate. Although this disclosure describes and illustrates a particular communication interface, this disclosure contemplates any suitable communication interface.

In particular embodiments, bus 712 includes hardware, software, or both coupling components of computer system 700 to each other. As an example and not by way of limitation, bus 712 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 712 may include one or more buses 712, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

What is claimed is:

1. A method, comprising:
    by a computer server machine, receiving multimedia content information associated with at least one segment of a multimedia content;
    by the computer server machine, receiving, from a client device, a request to view the at least one segment of the multimedia content;
    by the computer server machine, logging playback information associated with the viewing of the at least one segment of the multimedia content;
    by the computer server machine, determining a multimedia quality metric associated with the at least one segment of multimedia content using a machine-learning model trained to compute the multimedia quality metric based in part upon a portion of the received multimedia content information and a portion of the logged playback information; and
    by the computer server machine, classifying the at least one segment of the multimedia content with the multimedia quality metric.

2. The method of claim 1, further comprising determining, by the computer server machine, that the at least one segment of the multimedia content is a high-quality segment by comparing the multimedia quality metric with a threshold.

3. The method of claim 2, wherein the threshold comprises an adaptive threshold based in part upon a geographical region associated with the client device.

4. The method of claim 1, further comprising:
receiving feedback associated with the classification of the at least one segment of the multimedia content; and
updating a calculation used to determine the multimedia quality metric.

5. The method of claim 1, wherein the multimedia content information may comprise at least one of the following characteristics:
resolution of the at least one segment of the multimedia content;
content analytics associated with the at least one segment of the multimedia content;
compression of the at least one segment of the multimedia content;
encoding format of the at least one segment of the multimedia content; and
compression quality associated with the at least one segment of the multimedia content.

6. The method of claim 1, wherein the playback information may comprise at least one of the following characteristics:
bit rate associated with the viewing of the at least one segment of the multimedia content;
dimension of the display associated with the client device;
orientation of the display associated with the viewing of the at least one segment of the multimedia content;
resolution of display associated with the client device; and
viewing interface associated with the viewing of the at least one segment of the multimedia content.

7. The method of claim 1, wherein receiving multimedia content information associated with at least one segment of a multimedia content further comprises receiving multimedia content information associated with at least one segment of a multimedia content from one or more transcoding servers.

8. The method of claim 1, wherein the machine-learning model is trained with a large collection of multimedia content streaming records.

9. One or more computer-readable non-transitory storage media embodying software that is operable when executed to:
receive multimedia content information associated with at least one segment of a multimedia content;
receive, from a client device, a request to view the at least one segment of the multimedia content;
log playback information associated with the viewing of the at least one segment of the multimedia content;
determine a multimedia quality metric associated with the at least one segment of multimedia content using a machine-learning model trained to compute the multimedia quality metric based in part upon a portion of the received multimedia content information and a portion of the logged playback information; and
classify the at least one segment of the multimedia content with the multimedia quality metric.

10. The media of claim 9, wherein the software is further operable when executed to determine that the at least one segment of the multimedia content is a high-quality segment by comparing the multimedia quality metric with a threshold.

11. The media of claim 10, wherein the threshold comprises an adaptive threshold based in part upon a geographical region associated with the client device.

12. The media of claim 9, wherein the software is further operable when executed to:
receive feedback associated with the classification of the at least one segment of the multimedia content; and
update a calculation used to determine the multimedia quality metric.

13. The media of claim 9, wherein the multimedia content information may comprise at least one of the following characteristics:
resolution of the at least one segment of the multimedia content;
content analytics associated with the at least one segment of the multimedia content;
compression of the at least one segment of the multimedia content;
encoding format of the at least one segment of the multimedia content; and
compression quality associated with the at least one segment of the multimedia content.

14. The media of claim 9, wherein the playback information may comprise at least one of the following characteristics:
bit rate associated with the viewing of the at least one segment of the multimedia content;
dimension of the display associated with the client device;
orientation of the display associated with the viewing of the at least one segment of the multimedia content;
resolution of display associated with the client device; and
viewing interface associated with the viewing of the at least one segment of the multimedia content.

15. The media of claim 9, wherein receiving multimedia content information associated with at least one segment of a multimedia content further comprises receiving multimedia content information associated with at least one segment of a multimedia content from one or more transcoding servers.

16. The media of claim 9, wherein the machine-learning model is trained with a large collection of multimedia content streaming records.

17. A system comprising:
one or more processors; and
one or more computer-readable non-transitory storage media coupled to one or more of the processors and comprising instructions operable when executed by one or more of the processors to cause the system to:
receive multimedia content information associated with at least one segment of a multimedia content;
receive, from a client device, a request to view the at least one segment of the multimedia content;
log playback information associated with the viewing of the at least one segment of the multimedia content;
determine a multimedia quality metric associated with the at least one segment of multimedia content using a machine-learning model trained to compute the multimedia quality metric based in part upon a portion of the received multimedia content information and a portion of the logged playback information; and
classify the at least one segment of the multimedia content with the multimedia quality metric.

18. The system of claim 17, wherein the processors are further operable when executing the instructions to determine that the at least one segment of the multimedia content is a high-quality segment by comparing the multimedia quality metric with a threshold.

* * * * *